(12) United States Patent
Lang et al.

(10) Patent No.: US 6,692,131 B1
(45) Date of Patent: Feb. 17, 2004

(54) LEFT AND RIGHT REARVIEW MIRRORS WITH COMMON COMPONENTS

(75) Inventors: Heinrich Lang, Ergersheim (DE); Albrecht Popp, Weihenzell (DE); Jürgen Pfanz, Schillingsfürst (DE)

(73) Assignee: Lang Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 09/303,504

(22) Filed: Apr. 30, 1999

(51) Int. Cl.⁷ .......................... G02B 5/08; G02B 7/182; B60R 1/06
(52) U.S. Cl. .............. 359/850; 359/855; 359/871; 359/872; 248/475.1; 248/476
(58) Field of Search .................. 359/841, 855, 359/871, 872, 881, 850, 865, 877; 248/475.1, 476, 477, 479

(56) References Cited

U.S. PATENT DOCUMENTS

| | | | |
|---|---|---|---|
| 3,609,014 A | * | 9/1971 | Kurz, Jr. |
| 4,197,762 A | | 4/1980 | Yamana |
| 4,394,066 A | * | 7/1983 | Sharp |
| 4,422,724 A | | 12/1983 | Otsuka et al. |
| 4,506,954 A | | 3/1985 | Enomoto |
| 4,613,107 A | * | 9/1986 | Vitaloni |
| 4,678,294 A | | 7/1987 | Van Nostrand |
| 4,701,037 A | | 10/1987 | Bramer |
| 4,809,561 A | | 3/1989 | Tsuyama |
| 4,957,359 A | | 9/1990 | Kruse et al. |
| 4,988,178 A | | 1/1991 | Eifert |
| 4,991,814 A | * | 2/1991 | Schmidt et al. ............. 248/479 |
| 4,991,950 A | | 2/1991 | Lang et al. |
| 4,998,814 A | * | 3/1991 | Perry |
| 5,031,871 A | | 7/1991 | Ohta et al. |
| 5,098,058 A | | 3/1992 | Polzer et al. |
| 5,110,196 A | | 5/1992 | Lang et al. |
| 5,115,352 A | | 5/1992 | do Espirito Santo |
| 5,137,247 A | | 8/1992 | Lang et al. |
| 5,155,625 A | | 10/1992 | Komatsu et al. |
| 5,227,924 A | * | 7/1993 | Kerper ........................ 359/881 |
| 5,268,795 A | | 12/1993 | Usami |
| 5,268,797 A | * | 12/1993 | Santo .......................... 359/872 |
| 5,337,188 A | * | 8/1994 | Do Espirito Santo ....... 359/872 |
| 5,363,245 A | * | 11/1994 | Borello ........................ 248/476 |
| 5,483,385 A | * | 1/1996 | Boddy ......................... 359/881 |
| 5,583,703 A | | 12/1996 | Lang et al. |
| 5,604,644 A | | 2/1997 | Lang et al. |
| 5,615,054 A | | 3/1997 | Lang et al. |
| 5,621,577 A | * | 4/1997 | Lang et al. ................. 359/877 |
| 5,657,174 A | | 8/1997 | Boddy |
| 5,687,035 A | | 11/1997 | Lang |
| 5,721,646 A | * | 2/1998 | Catlin et al. ................ 359/865 |
| 5,726,816 A | * | 3/1998 | Gordon ........................ 359/872 |
| 5,760,980 A | * | 6/1998 | Lang ........................... 359/872 |
| 5,798,882 A | | 8/1998 | Lang |
| 5,844,733 A | * | 12/1998 | Ravanini .................... 359/872 |
| 5,889,627 A | | 3/1999 | Englander et al. |
| 6,059,419 A | | 5/2000 | Englander et al. |

* cited by examiner

*Primary Examiner*—Ricky D. Shafer
(74) *Attorney, Agent, or Firm*—McNair Law Firm PA; Cort Flint

(57) ABSTRACT

A rearview mirror system includes components that can be used on both the left and right side of a vehicle. Only one carrier plate need be used to mount the mirrors. By changing mounting procedure on the two identical carrier plates, one carrier plate may be used for both the right and left mirrors, thereby reducing the number of components. A wedge-shaped transition piece may be used to provide the asymmetric mounting to thereby allow for mounting on the right and left sides of vehicles.

18 Claims, 8 Drawing Sheets

LEFT AND RIGHT REARVIEW MIRRORS WITH COMMON COMPONENTS

BACKGROUND OF THE INVENTION

Figure 1:
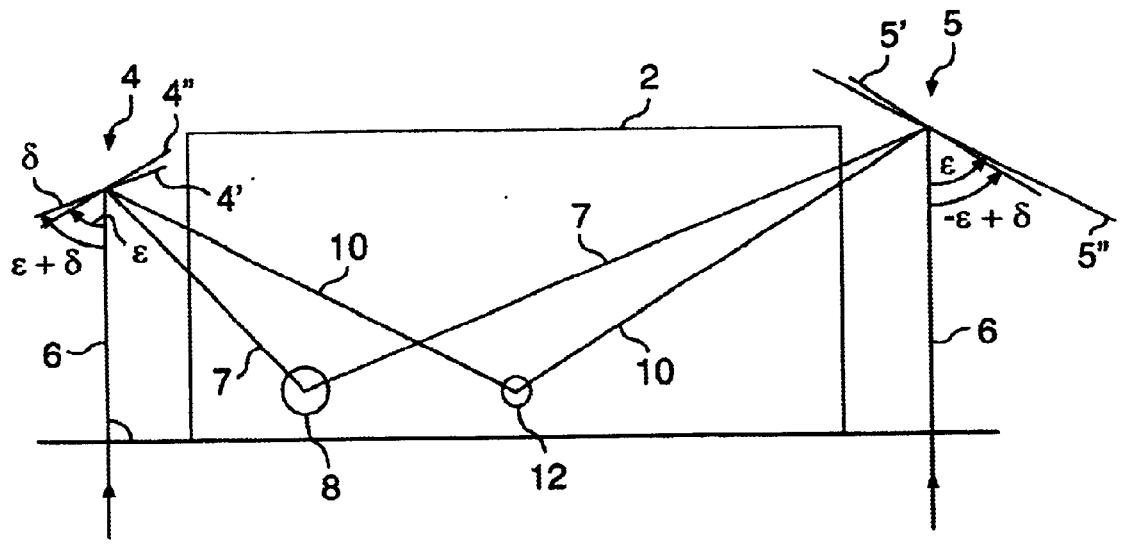

The invention is concerned with left and right outside rearview mirrors for commercial vehicles having common components.

As a rule, in the case of commercial vehicles, a left side rearview mirror is mounted in conjunction with a right hand rearview mirror. Because of the complexity of modern rearview mirror systems, especially where electrically adjustable mirrors are concerned, different components are necessary for each of the left and right side external mirrors. This multiplicity leads to high costs. Outside mirrors for commercial vehicles are, for example, made known by EP-W-0 500 510.

OBJECTIVES AND SUMMARY OF THE INVENTION

It is the purpose of the present invention to make available a left and a right outside rearview mirror, in which the essential components of the mirror can be used for the left as well as the right outside mirror. This purpose will be achieved by the features of the present invention.

In accord with the invention, a carrier plate is made available, which, although lacking a special transition piece mounted thereon for a mirror assembly, still provides a zero-position for a driver who sits, theoretically, in the middle of the driver cab. The transition piece is now installed, on an identical carrier plate on the left mirror as on the right mirror, in such a manner that the zero-position of either mirror is inclined at an angle "delta" in a positive direction, that is, clockwise. Since the carrier plate remains unchanged, out of what was once a multitude of carrier plates, only one carrier plate now comprises both one "left" and one "right" carrier plate. Expressed in a different way, it is possible by changing the mounting procedure on two identical carrier plates to let one carrier plate design serve for right and left mirrors. The number of different components is thus reduced.

Preferably, the transition piece is made wedge shaped, the slope of which is the angle "δ".

In accord with another aspect of the invention, the same transition piece possesses elements for mounting on either the left mirror or the right mirror.

In accord with another aspect of the invention, there is installed on the left housing a left framing and likewise on the right housing, a right framing. By means of separate design of frames and housings, the mounting of the entire outside mirror is made easier. By the different framings for left and right mirrors, the different zero-position of the mirror assembly in the left and right mirrors compensate optically.

In accord with yet another aspect of the invention, the support for the two outside mirrors includes respectively, two support arms, which are affixed on the vehicle side by means of a snap-in holder and joined to the mirror housing by a conically seating, clamping apparatus.

By the conically seating, clamping apparatus, a self centering effect is achieved and a secure hold is always assured. This reduces vibration. By means of the snap-in holder of the two arms on the vehicle, there is made a double securement which likewise assures a tight connection.

Further details, features and advantages of the invention are evident from the following description of a preferred embodiment, with the help of drawings.

BRIEF DESCRIPTION OF THE INVENTION

Figure 2:
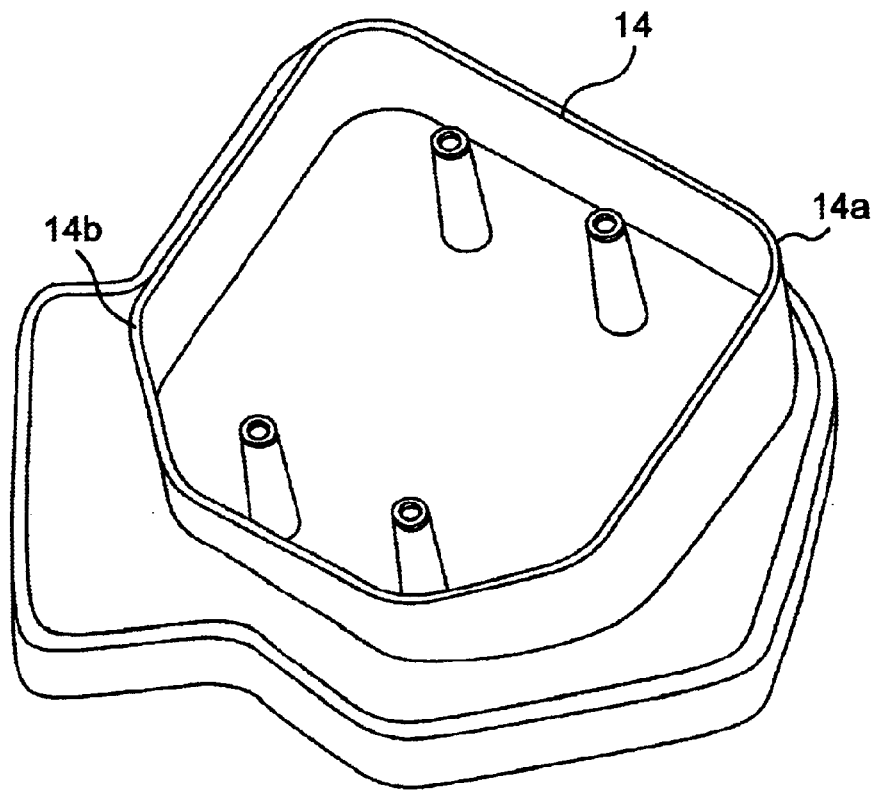
Figure 3:
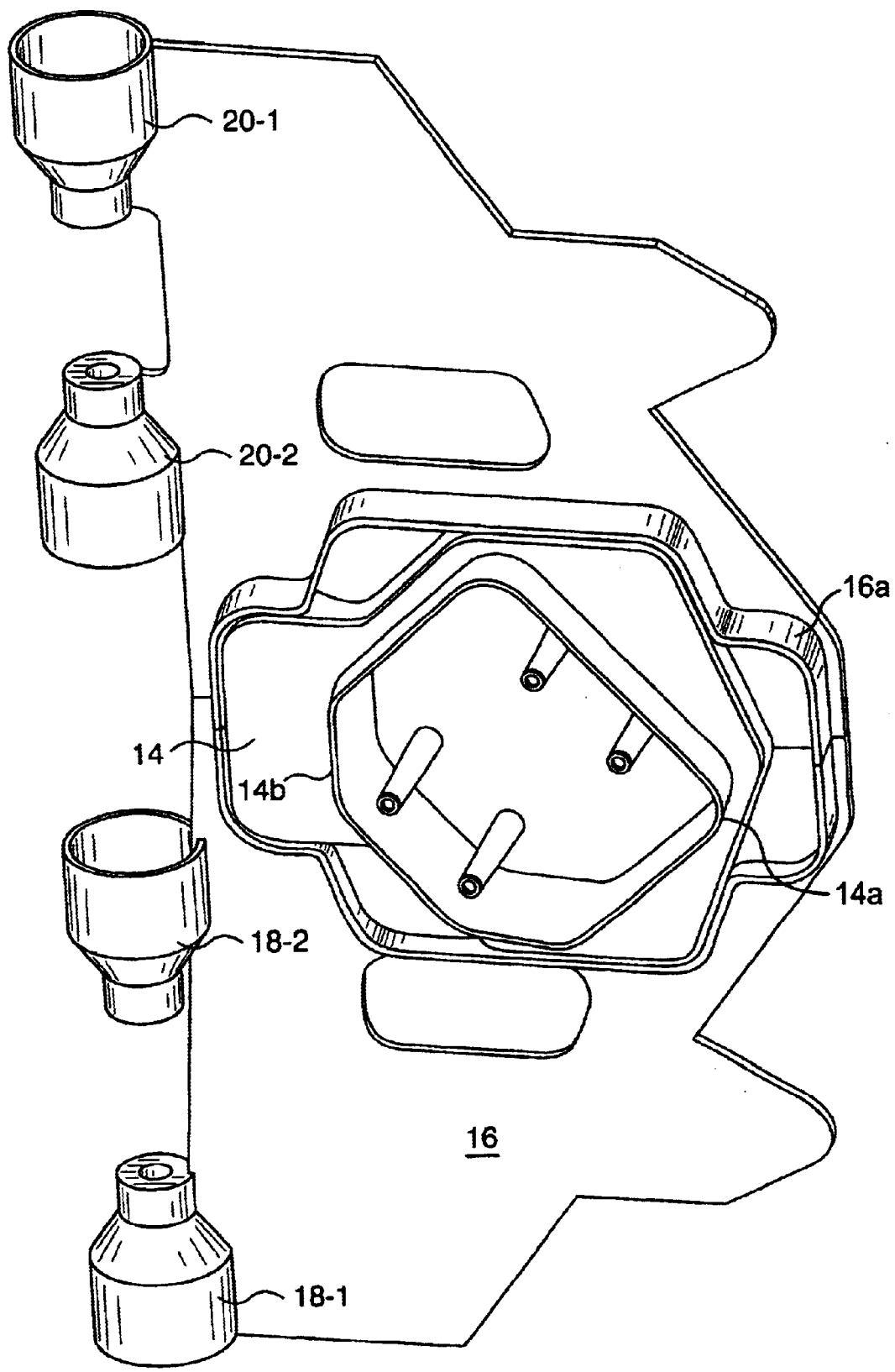
Figure 4:
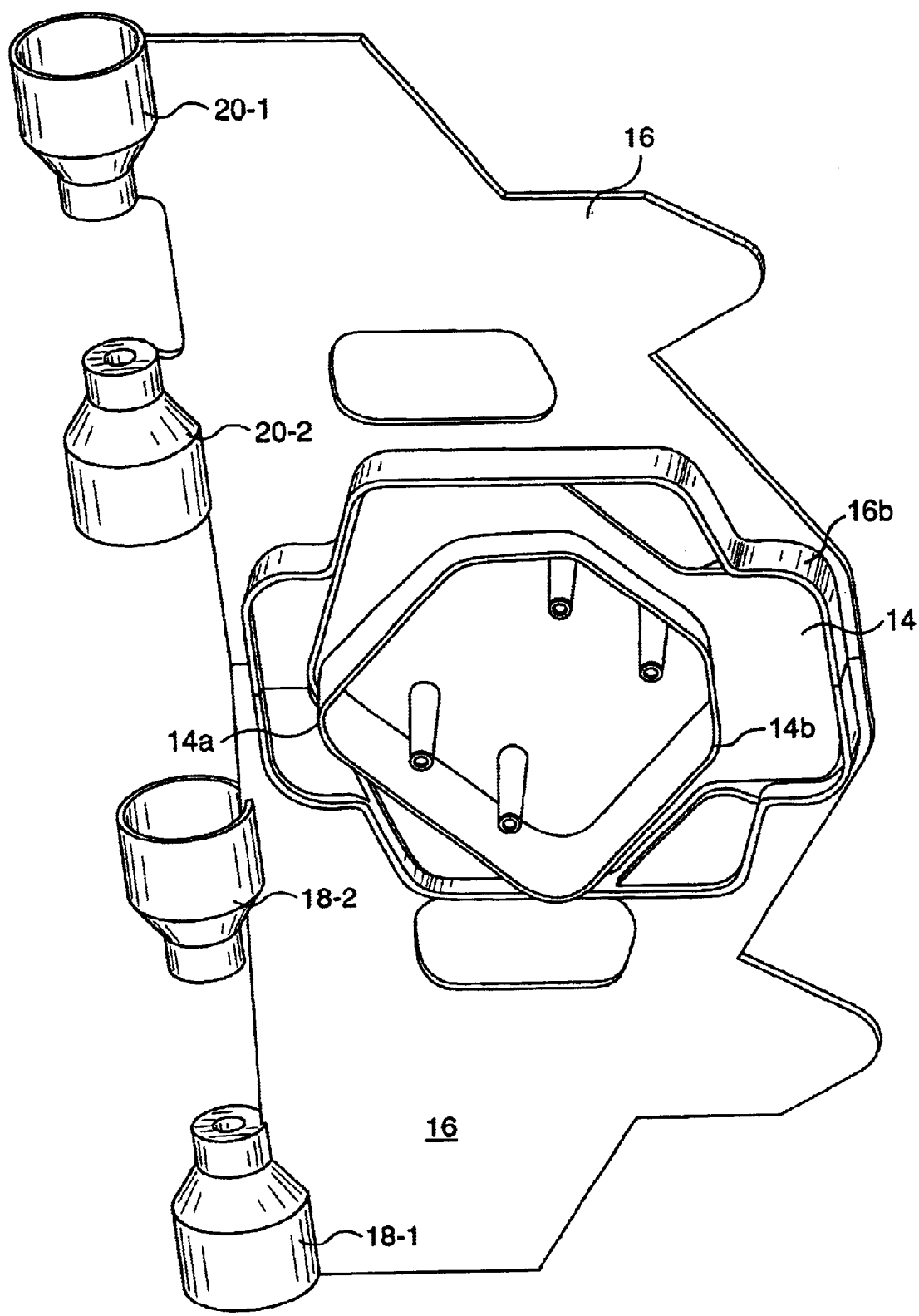
Figure 5:
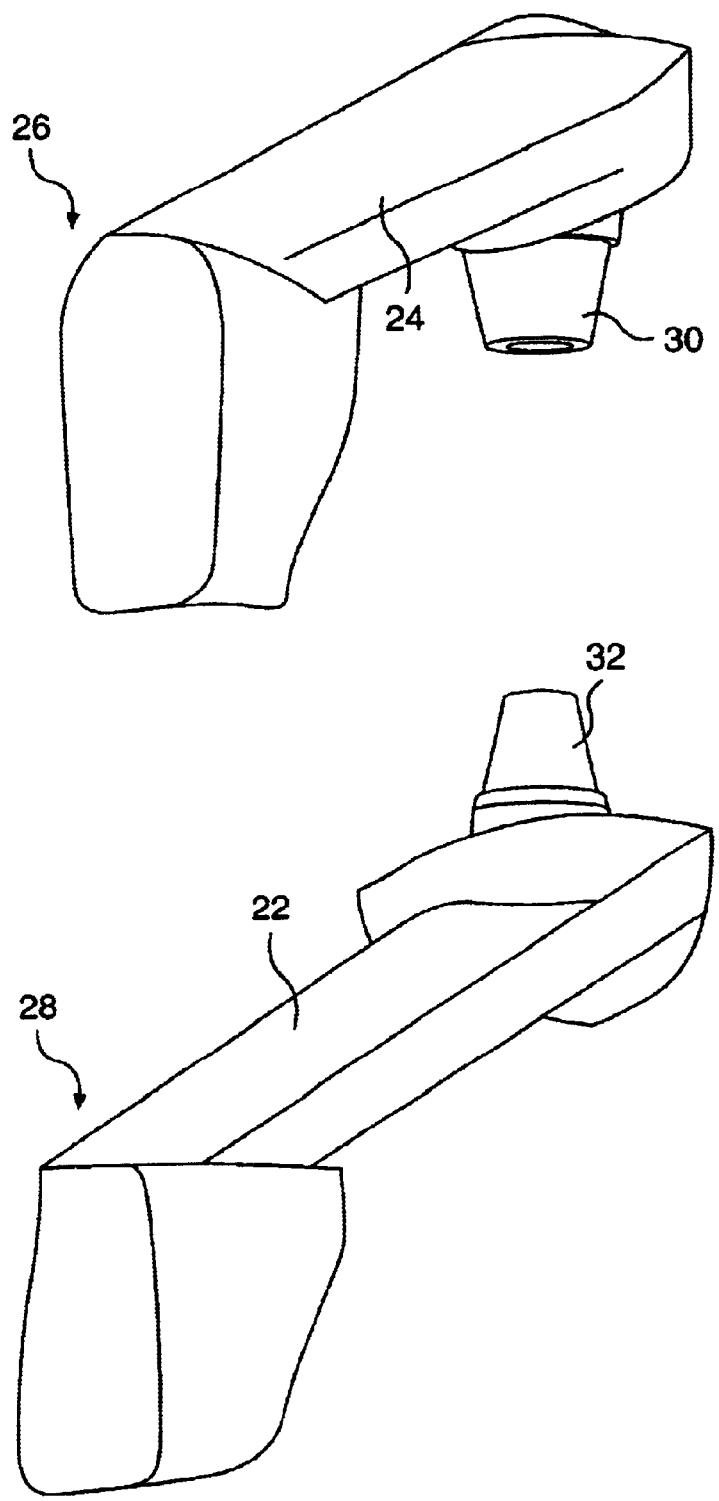
Figure 6:
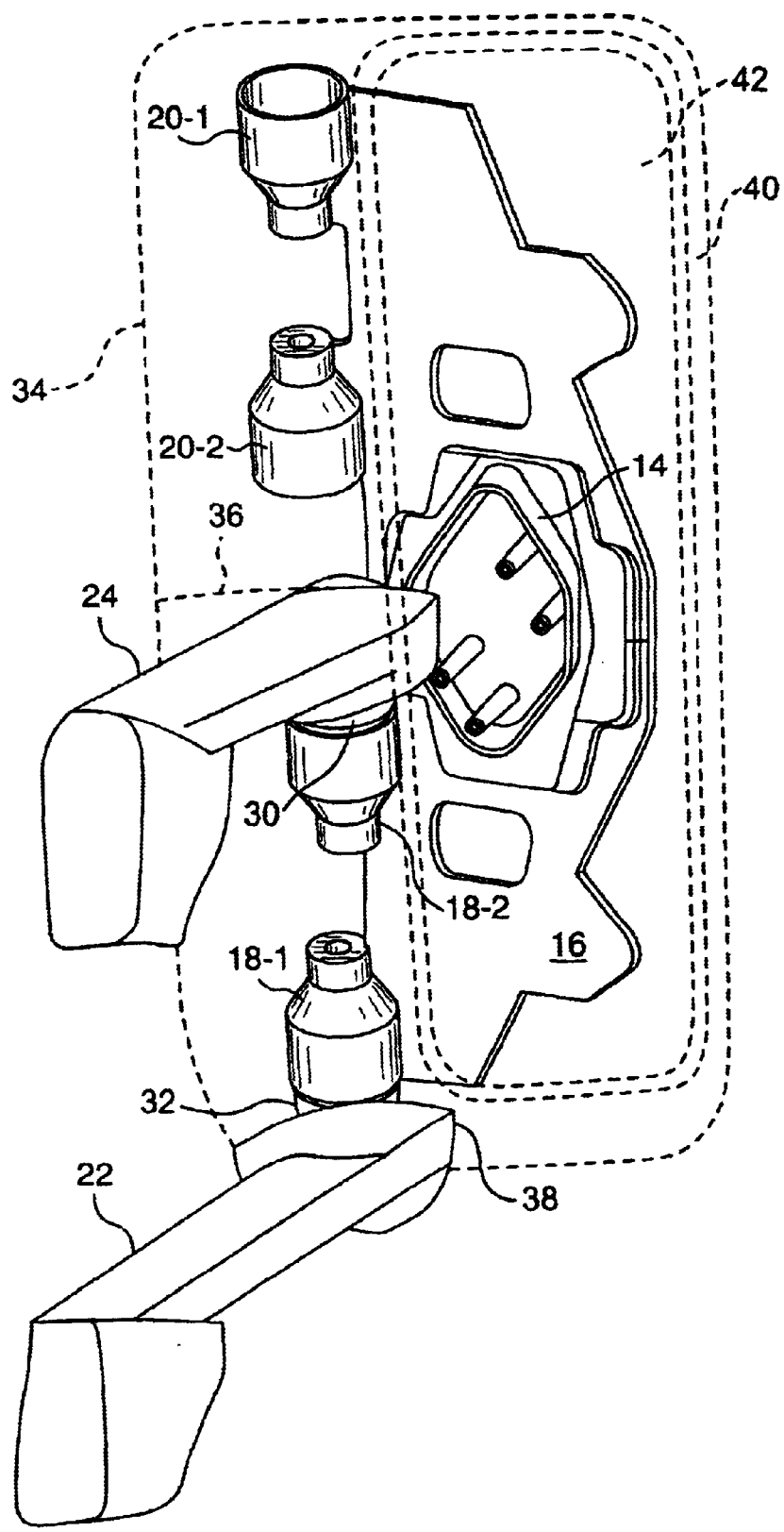
Figure 7:
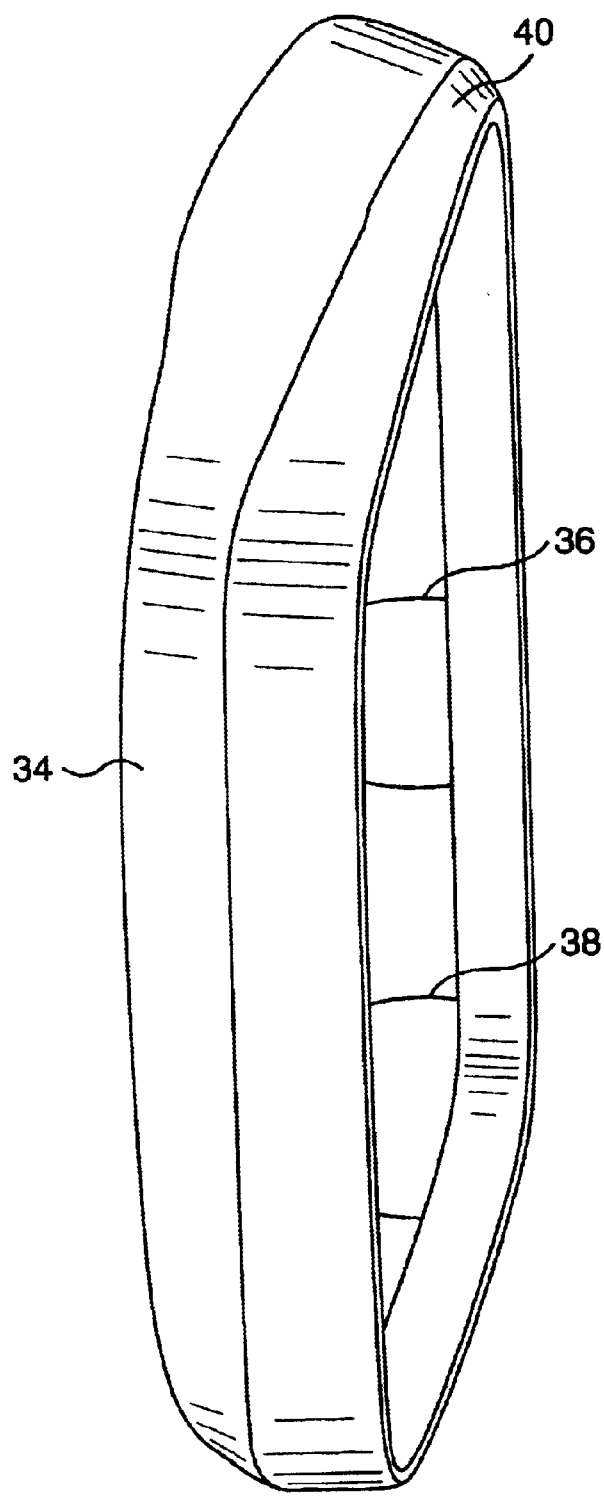
Figure 8:
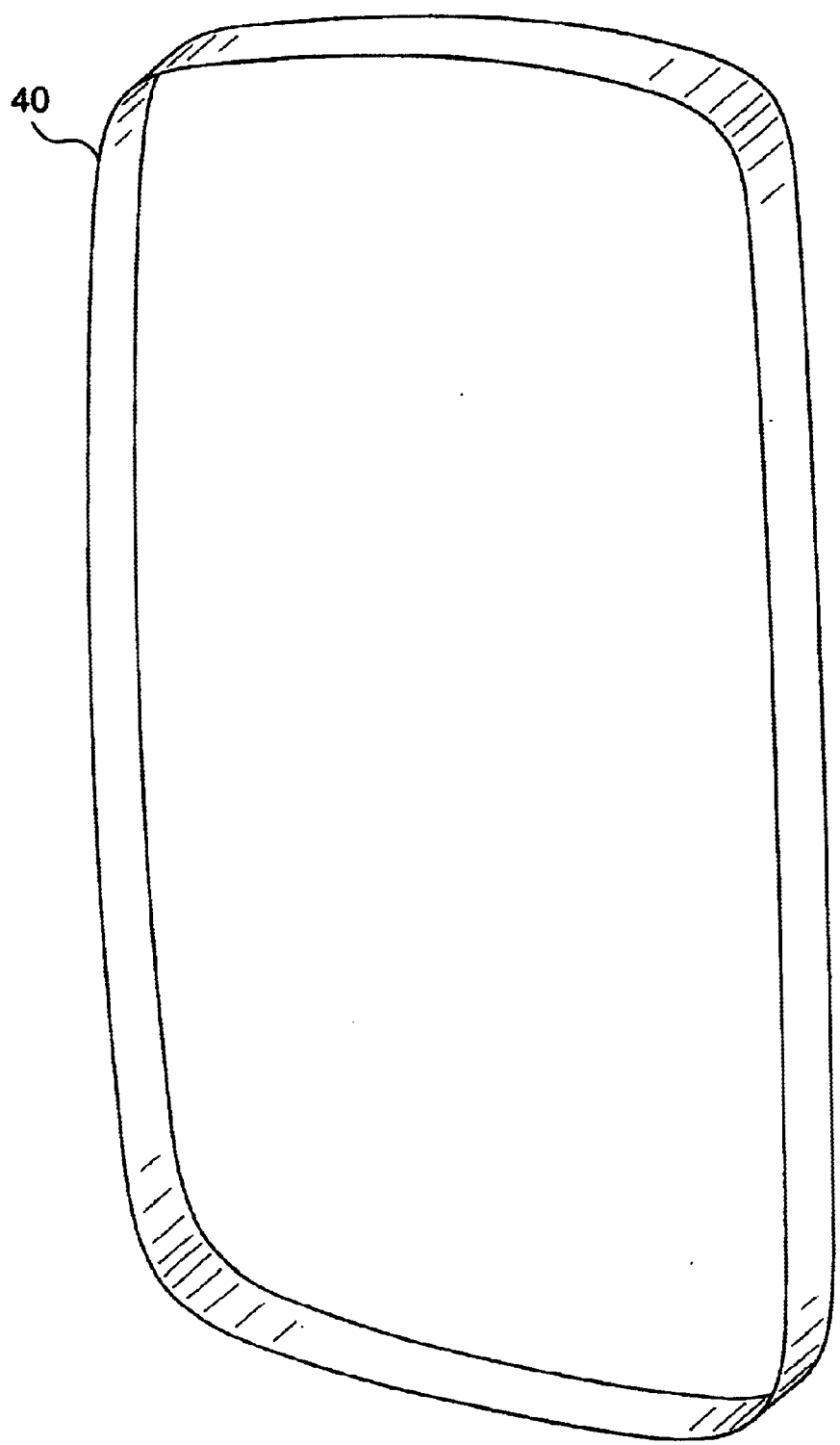
Figure 9:
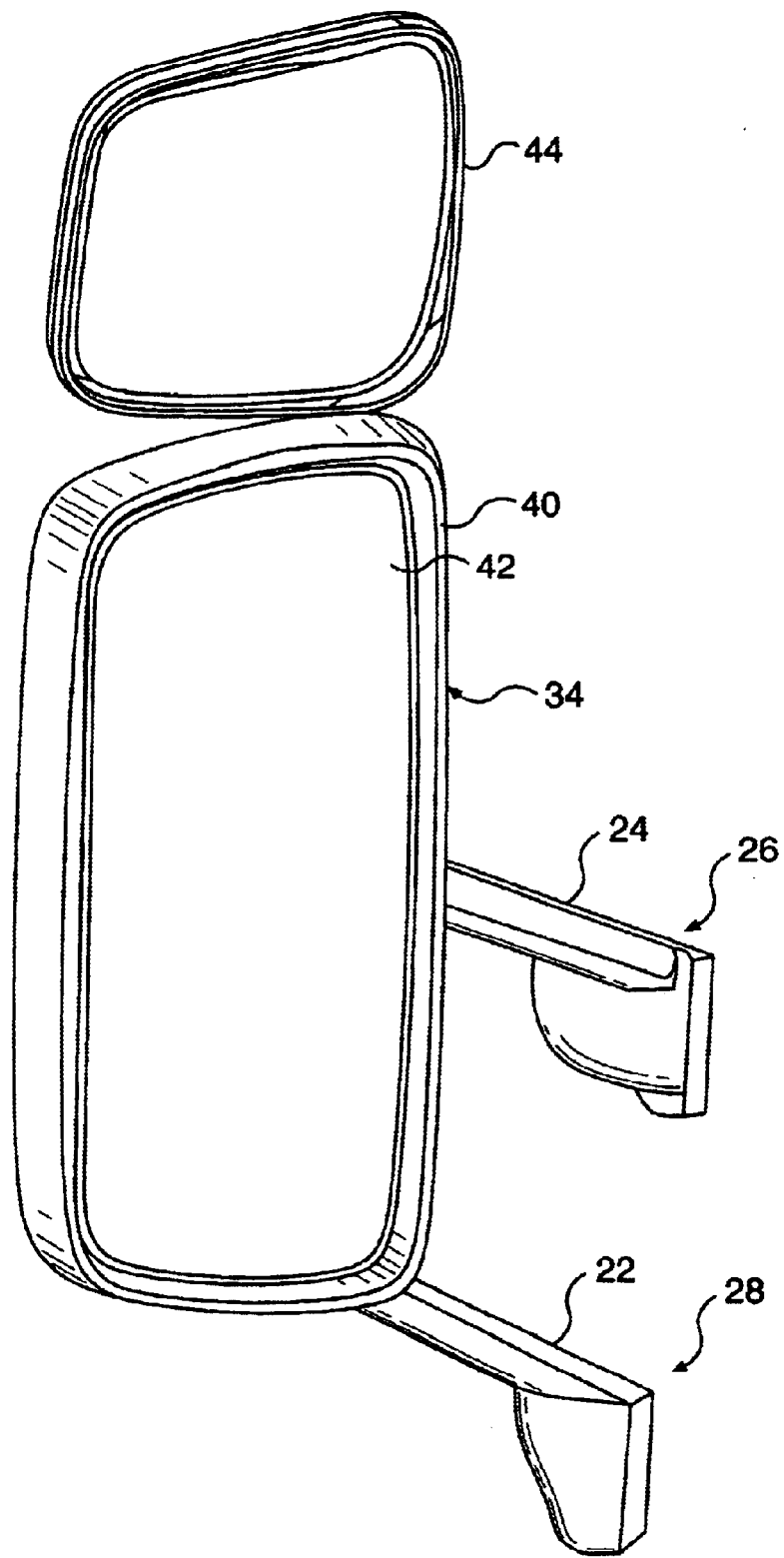

There is shown in:

FIG. 1 a schematic presentation for the explanation of the basic concepts of the present invention showing a driver's cab and two mirrors, FIG. 2 an example of a transition piece to be disposed between a carrier plate and the mirror assembly, FIG. 3 a pictorial representation of the transition piece of FIG. 2 on the carrier plate for a right mirror, that is, the mirror on the passenger side, FIG. 4 a pictorial representation of the transition piece of FIG. 2 on the carrier plate for a left mirror, that is, on the driver's side, FIG. 5 upper and lower support arms with a conical seating clamping apparatus for mounting on a housing and snap-in retainer on the vehicle, FIG. 6 the two support arms of FIG. 5 mounted on a carrier plate as in FIG. 3, FIG. 7 a framing and the housing in combined condition, FIG. 8 the framing alone, and FIG. 9 a perspective presentation of an an outside mirror in accord with the invention including all assembled parts.

DESCRIPTION OF THE PREFERRED EMBODIMENT

Reference will now be made in detail to the presently preferred embodiments of the present invention, one or more examples of which are illustrated in the drawings. Each example is provided by way of explanation of the invention, and not meant as a limitation of the invention.

FIG. 1 shows schematically the basic concept of the present invention. Accordingly, in schematic outline, a driver's cab 2, as well as a left and a right outside mirror 4 and 5 are depicted. Light beams 6 from an object (not shown) behind the vehicle strike the mirrors 4 and 5 and are reflected to a true driver's position 8. The light beams 6 may also be reflected by the mirrors 4 and 5 along lines 10 to a fictive driver's position 12. So that light from the object behind the vehicle is reflected along lines 7 to the true driver's position 8, the mirrors 4 and 5 must find themselves in a zero-position, which is designated by the reference numbers 4' and 5'. Belonging to the fictive driver's position 12, are the zero-positions 4" and 5" of the said mirrors 4 and 5.

If one measures the zero-position for the fictive driver's position 12 in relation to the light beams 6, then the zero-position 4" carries the value $\epsilon$ and the zero-position 5" the value $-\epsilon$. That is to say, the zero-positions 4" and 5" are symmetric in relation to the incident light beam 6. In order to obtain the zero-positions 4' and 5' for the true driver's position 8, the zero-positions 4" and 5" must be inclined by the angle $\delta$, so that for the zero-position 4' the angle of the incoming beam to the mirror falls at $\epsilon+\delta$, and for the zero-position 5', the corresponding angle is $-\epsilon+\delta$.

The asymmetric zero-positions 4' and 5' can be obtained by means of a corresponding mounting of a transition piece 14, as is shown in FIG. 2, on a carrier plate 16, as is shown in the FIGS. 3 and 4. The thickness of transition piece 14 is greater at point 14a than at point 14b, thereby creating an angle $\delta$ when viewed edge-on. Transition piece 14 may be mounted in either of two positions within ridge 16a of carrier plate 16, as shown in FIGS. 3 and 4.

As may be seen from FIGS. 3 and 4, the carrier plate 16 includes first, respectively "right" conic retaining means 18-1 as well as 18-2 for mounting of the support arms 22, 24 in the "right" outside mirror and second, the "left" conic retaining means 20-1 and 20-2 for the mounting of the support arms 22 and 24 in the "left" outside mirror.

In FIGS. 5 and 6, the lower and upper support arms 22 and 24 are shown, which exhibit for mounting on the vehicle, respectively a snap-in support 26 or 28, and for mounting on the carrier plate 16 respectively conical retaining means 30 and 32.

In FIG. 7 the frame 40 and the housing 34 of the left outside mirror are presented showing openings 36 and 38 for receiving elements 30 and 32. In FIG. 8, the frame 40 of the driver's mirror, i.e. of the left mirror is shown.

FIG. 9 shows a perspective drawing of the entire left outside mirror including a mirror glass 42 and secondary mirror assembly 44.

It will be apparent to those skilled in the art that various modifications and variations can be made in the present invention without departing from the scope and spirit of the invention. It is intended that the present invention include such modifications and variations as come within the scope of the appended claims and their equivalents.

What is claimed is:

1. Left and right rear view mirror assemblies for attachment to a vehicle comprising:
   a right support and a left support, each for attachment to the vehicle;
   a right housing and a left housing;
   a first carrier plate and a second carrier plate identical to the first carrier plate, the first carrier plate secured to the right support, and the second carrier plate secured to the left support, the first carrier plate disposed within the right housing, the second carrier plate disposed within the left housing;
   a first transition piece and a second transition piece identical to the first transition piece, both transition pieces having a first point having a thickness and a second point spaced from the first point and having a second thickness less than the first thickness, the difference in the first and second thicknesses defining an angle δ, the first transition piece being secured to the first carrier plate within the right housing and the second transition piece being secured to the second carrier plate within the left housing, the first transition piece being disposed in an orientation with respect to the first carrier plate rotated 180° relative to an orientation with respect to the second carrier plate of the second transition piece; and
   a first mirror assembly and a second mirror assembly identical to the first mirror assembly, the first transition piece attached between the first carrier plate and the first mirror assembly and the second transition piece attached between the second carrier plate and the second mirror assembly so as to reflect light from behind the vehicle to a true driver's position when the first and second mirror assemblies are each in a respective zero position.

2. The assemblies of claim 1 wherein the first and second mirror assemblies each include respective mirror glasses, the presence of the first and second transition pieces between the first and second carrier plates and the respective mirror assemblies causing the mirror glasses to rotate clockwise by the angle δ when viewed from above when the first and second mirror assemblies are in their zero positions.

3. The assemblies of claim 2, wherein the mirror glasses reflect objects opposite a direction of travel relative to the mirror glasses to the true driver's position.

4. The assemblies of claim 1, wherein the first and second transition pieces are each configured as wedge-shaped.

5. The assemblies of claim 1, wherein the first and second carrier plates each define a ridge for receiving a given one of the first and second transition pieces in either of two 180° rotated orientations.

6. The assemblies of claim 1, further including a right frame attached to the right housing and a left frame attached to the left housing.

7. The assemblies of claim 1, wherein each carrier plate has two mounting mechanisms, one of the mounting mechanisms for mounting the carrier plate to the right support and the other of the mounting mechanisms for mounting the carrier plate to the left support.

8. The assemblies of claim 7, wherein the mounting mechanisms each include two retaining members.

9. A reversible rearview mirror subassembly useful for a left or right side mirror for a vehicle, the subassembly being disposable within a mirror housing and attachable to the vehicle via a support arm extending into the mirror housing, and supporting a mirror assembly, the subassembly comprising:
   a carrier plate disposed within the mirror housing, the carrier plate configured to be used for either of the left or right side mirrors, the carrier plate attachable to the vehicle via the support arm; and
   a reversible wedge-shaped transition piece disposed within the mirror housing and configured to be used for either of the left or right side mirrors, the carrier plate being configured to receive the transition piece in multiple orientations, the transition piece being attachable to the carrier plate in a first orientation for use as the left side mirror and being attachable to the carrier plate in a second orientation for use as the right side mirror, the first orientation being substantially opposite the second orientation, the mirror assembly being attachable to the carrier plate via the transition piece.

10. The subassembly of claim 9, wherein the mirror housing is a left side mirror housing.

11. The subassembly of claim 9, wherein the mirror housing is a right side mirror housing.

12. The subassembly of claim 9, wherein the carrier plate defines a substantially planar surface and a ridge extending outward from the substantially planar surface, the transition piece having an outer shape that fits within the ridge on the carrier plate in either of the first or second orientations.

13. The subassembly of claim 9, wherein the carrier plate includes two mounting mechanisms, one of the mounting mechanisms for mounting the carrier plate for a left side mirror, and the other of the mounting mechanisms for mounting the carrier plate for a right side mirror.

14. The subassembly of claim 13, wherein the mounting mechanisms each include two retaining members.

15. The subassembly of claim 1, further including the mirror assembly attached to the transition piece.

16. The subassembly of claim 1, further including the support arm attached to the carrier plate.

17. The subassembly of claim 1, further including the mirror housing being attachable to the vehicle.

18. The subassembly of claim 1, further including the mirror housing, the mirror assembly attached to the transition piece, and the support arm attached to the carrier plate.

* * * * *